US011049259B2

(12) United States Patent
Guo et al.

(10) Patent No.: US 11,049,259 B2
(45) Date of Patent: Jun. 29, 2021

(54) IMAGE TRACKING METHOD

(71) Applicant: NATIONAL CHIAO TUNG UNIVERSITY, Hsinchu (TW)

(72) Inventors: Jiun-In Guo, Hsinchu (TW); Ssu-Yuan Chang, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 39 days.

(21) Appl. No.: 16/523,161

(22) Filed: Jul. 26, 2019

(65) Prior Publication Data

US 2020/0058129 A1  Feb. 20, 2020

(30) Foreign Application Priority Data

Aug. 14, 2018  (TW) ................................ 107128361

(51) Int. Cl.
| | |
|---|---|
| *G06T 7/20* | (2017.01) |
| *G06T 5/20* | (2006.01) |
| *G06K 9/62* | (2006.01) |
| *G06K 9/38* | (2006.01) |

(52) U.S. Cl.
CPC ................. *G06T 7/20* (2013.01); *G06K 9/38* (2013.01); *G06K 9/6215* (2013.01); *G06T 5/20* (2013.01); *G06T 2207/30241* (2013.01)

(58) Field of Classification Search
CPC . G06T 7/20; G06T 7/246; G06T 2207/30241; G06T 5/20; G06K 9/6215; G06K 9/38; G06K 9/00771
See application file for complete search history.

(56) References Cited

U.S. PATENT DOCUMENTS

| | | | |
|---|---|---|---|
| 8,228,382 B2 | 7/2012 | Pattikonda | |
| 9,251,410 B1 | 2/2016 | Lin et al. | |
| 2014/0185876 A1* | 7/2014 | Almbladh | G06T 7/20 |
| | | | 382/103 |
| 2017/0116724 A1* | 4/2017 | Yin | G06T 7/70 |
| 2018/0341813 A1* | 11/2018 | Chen | G06K 9/00744 |
| 2019/0066313 A1* | 2/2019 | Kim | G06K 9/6215 |
| 2019/0163994 A1* | 5/2019 | Yonekawa | G06T 7/70 |

FOREIGN PATENT DOCUMENTS

| | | |
|---|---|---|
| CN | 106372570 A | 2/2017 |
| TW | 201042555 A1 | 12/2010 |
| TW | 201405489 A | 2/2014 |
| TW | 201612802 A | 4/2016 |

* cited by examiner

*Primary Examiner* — Chan S Park
*Assistant Examiner* — Daniel C Chang
(74) *Attorney, Agent, or Firm* — Birch, Stewart, Kolasch & Birch LLP

(57) ABSTRACT

An image tracking method of the present invention includes the following steps: (A) obtaining a plurality of original images by using an image capturing device; (B) transmitting the plurality of original images to a computing device, and generating a position box based on a preset image set; (C) obtaining an initial foreground image including a target object, and an identified foreground image is determined based on a pixel ratio and a first threshold; (D) obtaining a feature and obtaining a first feature score based on the feature of the identified foreground images; and (E) generating a target object matching result based on the first feature score and a second threshold, and recording a moving trajectory of the target object based on the target object matching result.

11 Claims, 12 Drawing Sheets

IMAGE TRACKING METHOD

BACKGROUND OF THE INVENTION

1. Field of the Invention

The present invention relates to image monitoring technologies, and specifically, to an image tracking method.

2. Description of the Prior Art

With the progress of image analysis technologies, more image analysis applications appear. For example, the image analysis applications are applied to places such as hypermarkets, department stores, and stores for image analysis, human image detection, and the like. In most of conventional image analysis methods, human image detection is performed on human heads, and that could easily lead to identification errors. Although there are other technologies for improving cases of identification errors, a photographing apparatus in a different view angle needs to be additionally disposed, leading to relatively high costs. Generally, in the prior art, the effect of identifying and tracking pedestrians in movement still needs to be improved.

SUMMARY OF THE INVENTION

One objective of the present invention is to provide an image tracking method that can improve the accuracy of detecting and tracking a target object.

The image tracking method includes the following steps: (A) continuously obtaining a plurality of original images corresponding to a detection range by using an image capturing device, where the plurality of original images include a first frame and a second frame; (B) transmitting the plurality of original images to a computing device, where the computing device identifies the plurality of original images to generate a position box corresponding to the target object based on a preset image set; (C) obtaining an initial foreground image including the target object from the position box, where there is a pixel ratio between the initial foreground image and the position box, and an identified foreground image is determined based on the pixel ratio and a first threshold; (D) obtaining a feature from the identified foreground image, and obtaining a first feature score based on the feature of the identified foreground image of the first frame and the feature of the identified foreground image of the second frame; and (E) generating a target object matching result based on the first feature score and a second threshold, and recording a moving trajectory of the target object based on the target object matching result. In this way, tracking on the target object is achieved.

DETAILED DESCRIPTION OF THE PREFERRED EMBODIMENT

Figure 1:
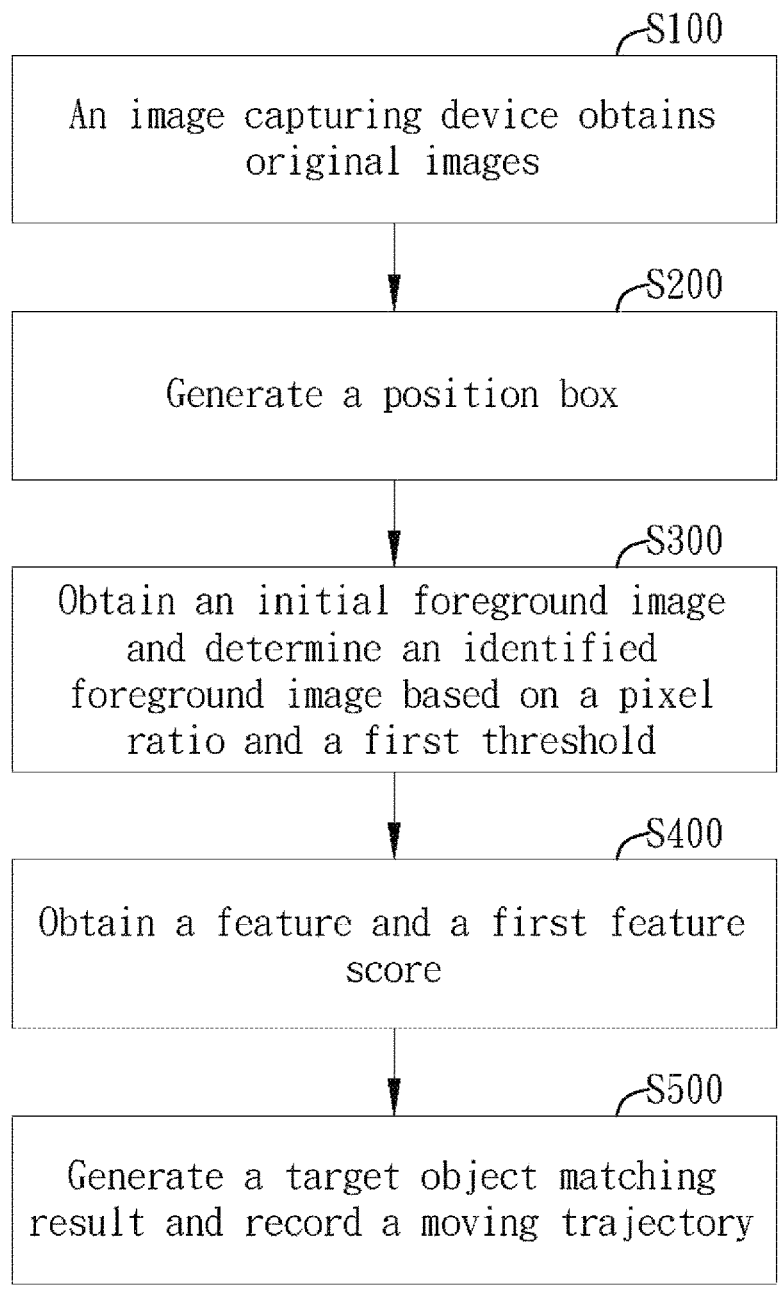
FIG. 1 is a flowchart of an embodiment of an image tracking method according to the present invention.

The present invention provides an image tracking method. FIG. 1 is a flowchart of an embodiment of an image tracking method according to the present invention. The image tracking method can be divided into stages, for example, stages at which original images are obtained, a position box is generated, an identified foreground image is determined, a first feature score is obtained, and a target object matching result is generated. As shown in FIG. 1, the image tracking method includes step S100 to step S500. In the step S100, a plurality of original images corresponding to a detection range are continuously obtained by using an image capturing device. The plurality of original images include a first frame and a second frame. For example, the first frame is obtained at a first moment, and then a second frame is obtained at a second moment.

Figure 2A:
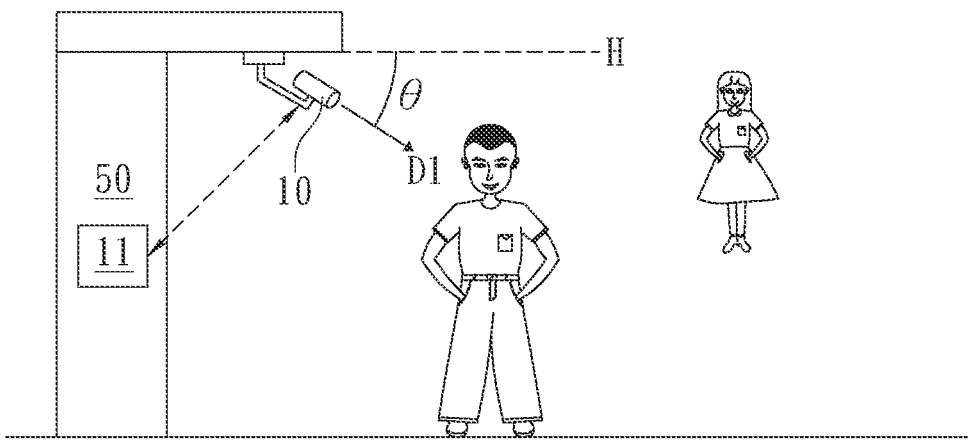
FIG. 2A is a schematic diagram of disposing an image capturing device.

Referring to FIG. 1 and FIG. 2A, FIG. 2A is a schematic diagram of disposing an image capturing device. As shown in FIG. 2A, an image capturing device 10 is disposed front of a store 50 for photographing a target object (for example, a person, an animal, or a vehicle) passing by the store 50. In an embodiment, the image capturing device 10 performs shooting in a depression angle. As shown in FIG. 2A, there is an angle θ between a shooting direction D1 of the image capturing device 10 and a horizontal line (H), and the angle is greater than 0 degrees and less than 90 degrees.

Referring to FIG. 1, in step S200, the original images are transmitted to a computing device. The computing device 11 (as shown in FIG. 2A) is, for example, a computer host. The computing device 11 is connected to the image capturing device in a wired or wireless manner. In other embodiments, an embedded apparatus may be used as the computing device based on the amount of computation, and the computing device 11 is preferably an apparatus having a graphics processing unit (GPU). In addition, in the step S200, the computing device identifies the original images based on a preset image set to generate a position box corresponding to the target object. The foregoing preset image set is, for example, a pedestrian image sample. For example, the pedestrian image sample includes a plurality of images containing pedestrians. A convolutional neural network model is trained by using the pedestrian image sample, and then the original images obtained by the image capturing device are identified by using the trained convolutional neural network model. When it is identified that a pedestrian appears in an original image, a position box is generated at a position corresponding to a position of the pedestrian. It should be understood that a range of the position box can be adjusted based on the size of the target object and a distance between the target object and the image capturing device. In other embodiments, the original images can be identified in another machine learning manner.

Figure 2B:
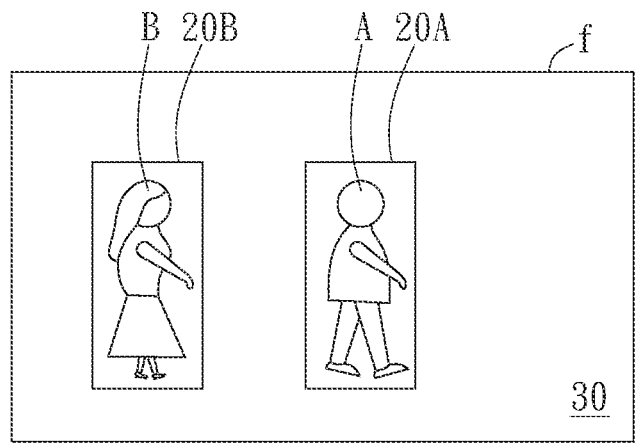
FIG. 2B is a schematic diagram of generating a position box.

Referring to FIG. 1 and FIG. 2B, FIG. 2B is a schematic diagram of generating a position box. As shown in FIG. 2B, a frame (f) is an original image obtained at a particular moment. In the frame (f), the computing device identifies that there are two target objects, which are a target object (A) and a target object (B), and position boxes (20A, 20B) are respectively generated at the target object (A) and the target object (B).

Referring to FIG. 1, in step S300, an initial foreground image including the target object is obtained from the position box. There is a pixel ratio between the initial foreground image and the position box. An identified foreground image is determined based on the pixel ratio and a first threshold.

By using FIG. 2B as an example, an image in each position box includes a target object and a background 30. The initial foreground image is the image obtained by removing a background component in the position box. The pixel ratio is a ratio of the number of pixels of the initial foreground image to the number of pixels of the position box. Whether the initial foreground image becomes the identified foreground image is determined based on the pixel ratio and the first threshold. In other words, it can be determined in this way whether the position box is an incorrect identification result, and a correct identification result is kept as the identified foreground image, so that the correctness of tracking the target object is improved.

In step S400, a feature is obtained from the identified foreground image. The feature (for example, indicated in a numeralization manner) is obtained from the identified foreground image of each target object, and the feature is recorded for subsequent scoring. The features may have a single type or a plurality of types. In addition, in the step S400, a first feature score is obtained based on the feature of the identified foreground image of the first frame and the feature of the identified foreground image of the second frame.

Figure 2C:
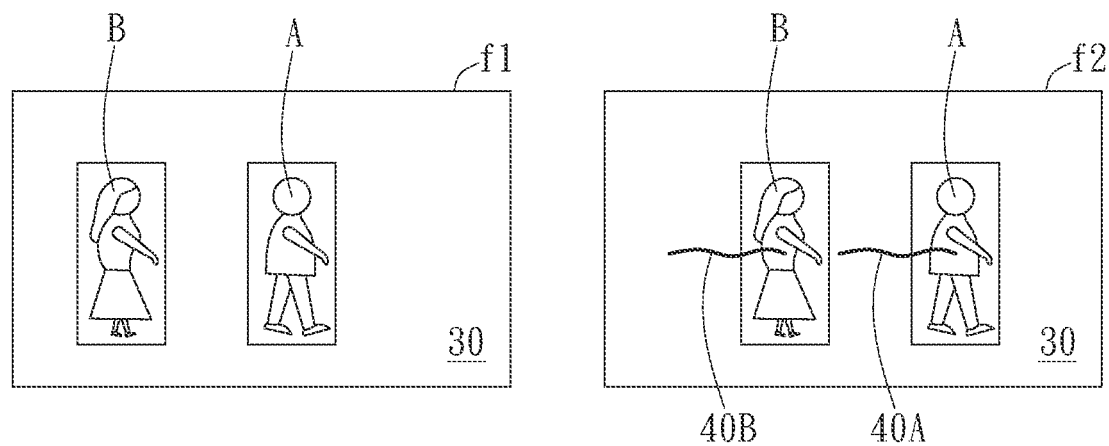
FIG. 2C is a schematic diagram of recording a moving trajectory.

FIG. 2C is a schematic diagram of recording a moving trajectory. By using FIG. 2C as an example, the image capturing device obtains a frame f1 and a frame f2 in sequence. It is identified that there are a target object (A) and a target object (B) in both two frames. The first feature score is obtained based on the feature of different frames (i.e. the feature of the target object in one frame and the feature of the target object in another frame). For example, the first feature score is obtained through calculation based on the feature of the identified foreground image of the target object (A) corresponding to the frame f1 and the feature of the identified foreground image of the target object (A) corresponding to the frame f2. The first feature score can also be obtained through calculation based on the feature of the identified foreground image of the target object (B) corresponding to the frame f1 and the feature of the identified foreground image of the target object (B) corresponding to the frame f2.

It should be noted that usually, the first frame is the image obtained before the second frame is obtained. In an embodiment, the second frame is the image obtained at a current moment, and the first frame is the image obtained at a moment previous to a moment at which the second frame is obtained. In some embodiments, the first frame is an image that is prior to the second frame and that is stored in a tracking form.

In the step S500, a target object matching result is generated based on the first feature score and a second threshold. It is determined whether the identified foreground images belong to the same target object based on the first feature score and the second threshold. By using Table 1 as an example, the target object (A) and the target object (B) are identified in the frame 1, and the identified foreground images of the target object (A) and the target object (B) are stored in the tracking form. A target object U1 and a target object U2 are identified in the frame 2. At this time, the identification result is not yet stored in the tracking form. After the first feature score is obtained, it is found that the target object U1 is the target object (A), and that the target object U2 is the target object (B) based on the first feature score and the second threshold. The identified foreground images obtained from the frame 2 are stored in the tracking form, and are classified based on the same target objects. In this way, the target object matching result is obtained, and tracking on the target object is achieved.

TABLE 1

|  | Frame 1 | Frame 2 |
|---|---|---|
| Tracking form | A | U1 = A |
|  | B | U2 = B |

In addition, in the step S500, a moving trajectory of the target object is recorded based on the target object matching result. As shown in FIG. 2C, after classification of the target objects is completed, the moving trajectory 40A of the target object (A) and the moving trajectory 40B of the target object (B) can be recorded in the frame f2.

Figure 3:
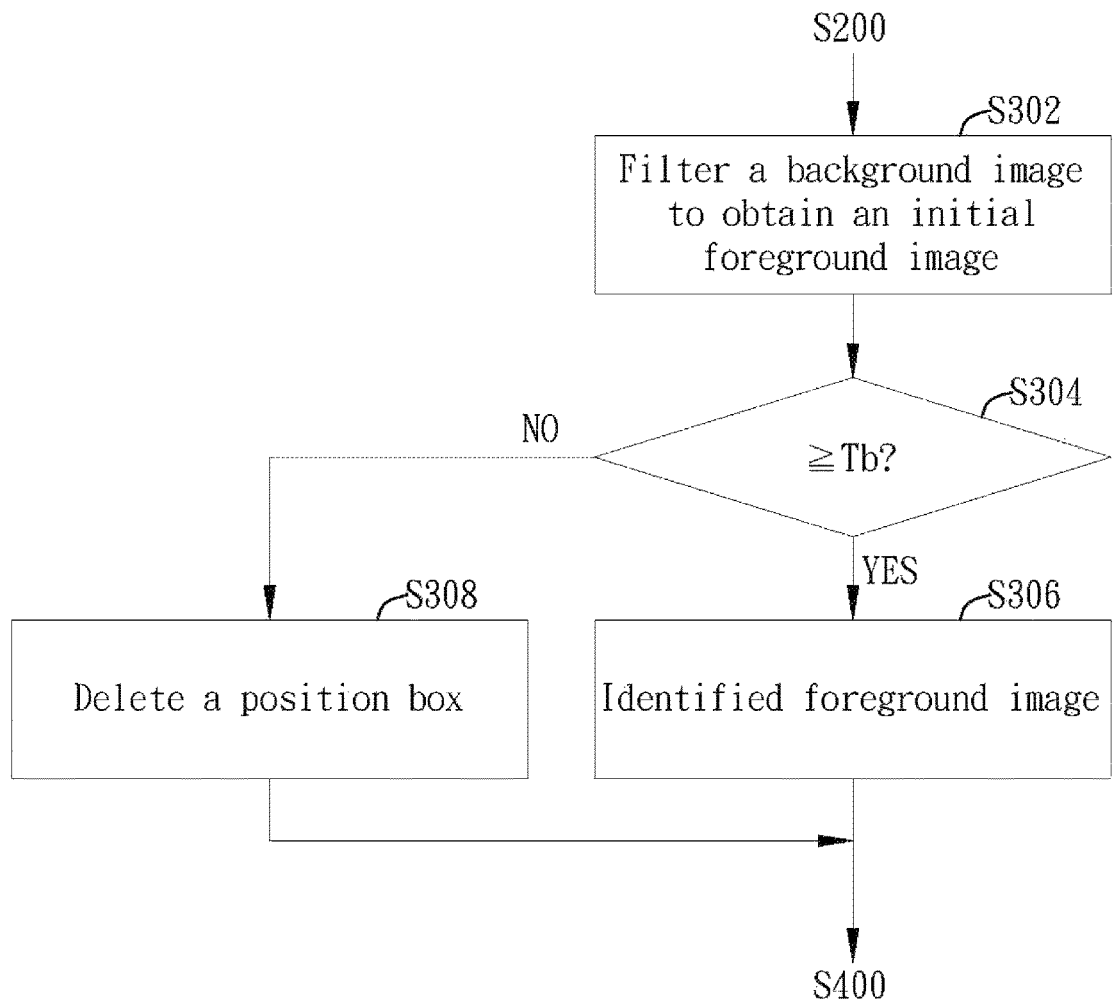
FIG. 3 is a flowchart of an embodiment of determining an identified foreground image.

FIG. 3 is a flowchart of an embodiment of determining an identified foreground image. As shown in FIG. 3, a flow of determining the identified foreground image includes step S302 to step S308. After the original images are obtained and the position box is generated, the flow proceeds to the step S302. In the step S302, the background image in the position box is filtered to obtain the initial foreground image. For example, the background image is separated from the position box by using a background subtraction method.

Figure 4:
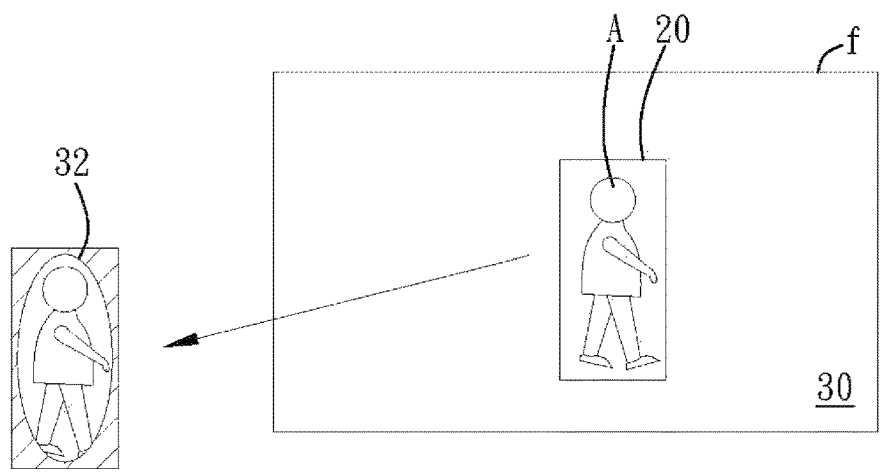
FIG. 4 is a schematic diagram of obtaining an initial foreground image.

Referring to FIG. 3 and FIG. 4, FIG. 4 is a schematic diagram of obtaining an initial foreground image 32. As shown in FIG. 4, a position box 20 corresponding to the target object (A) is generated in the frame (f), an unwanted part (slash region) is filtered by using the background subtraction method, and the remaining part is the initial foreground image 32.

In other embodiments, further processing can be performed through morphological computation in addition to the background subtraction method. For example, the initial foreground image can be obtained by adopting dilation and erosion computations to amplify image signals in the remaining part in the position box and adopting median filter to adjust image sharpness.

Returning to FIG. 3, in step S304 to the step S308, it is determined whether the initial foreground image is the identified foreground image. In the step S304, the pixel ratio is obtained, and it is determined whether the pixel ratio is greater than or equal to a first threshold $T_b$ (for example, $T_b$ is set to 0.5). When the pixel ratio is greater than or equal to the first threshold $T_b$, the initial foreground image is set to become the identified foreground image (step S306); and otherwise, when the pixel ratio is less than the first threshold, the position box corresponding to the initial foreground image is deleted (step S308).

Generally, the correctness of the identification result can be controlled in different manners. For example, the identification result can be more accurate by adjusting parameters of layers in a neural network model. In addition, the correctness of the identification result may be checked in the foregoing manner of setting the first threshold and calculating the pixel ratio. In this way, an effective identification result can be obtained by filtering the identification result, thereby optimizing the identification result.

It should be understood that a plurality of position boxes may be identified in one frame. Some of the position boxes may become identified foreground images, and the other position boxes do not become identified foreground images. In other examples, it may be determined that all position boxes in one frame should be deleted. In this case, a next frame is processed (returning to the step S100), and the step S400 is not performed.

Figure 5:
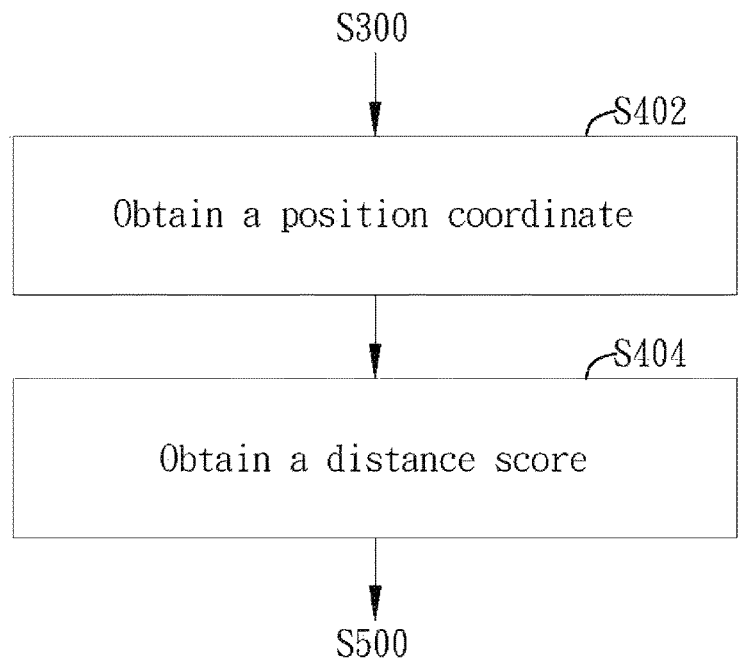
FIG. 5 is a flowchart of an embodiment of obtaining a first feature score.

FIG. 5 is a flowchart of an embodiment of obtaining a first feature score. As shown in FIG. 5, a flow of obtaining the first feature score includes step S402 to step S404. After the original images are obtained, the position box is generated, and the identified foreground image is determined, the flow proceeds to the step S402. In the step S402, a position coordinate is obtained from the identified foreground image. That is, the position coordinate is used as the feature. Preferably, the position coordinate corresponds to a whole of the target object. In other words, the position coordinate is obtained based on the entire target object, not the specific part of the target object. The position coordinate is, for example, a coordinate point of a geometric center of the identified foreground image.

In the step S404, a distance score is obtained based on the position coordinate of the identified foreground image of the first frame and the position coordinate of the identified foreground image of the second frame. That is, the distance score is used as the first feature score (referring to Table 2).

TABLE 2

| Feature | Scoring item | First feature score |
| --- | --- | --- |
| Position coordinate | Distance score Sd | Distance score Sd |

Specifically, a specified value about the distance is stored in the computing device. In addition, the distance can be calculated based on the position coordinates obtained from the first frame and the second frame. A distance score Sd can be obtained based on the specified value and the distance. For example, the specified value is 100 (pixels), and the distance score Sd can be defined in the following scoring function:

$$Sd = \begin{cases} 1 - \dfrac{x}{Td}, & \text{if } x \leq 100 \\ 0, & x > 100 \end{cases}$$

where x is the distance, and Td is the specified value. According to the foregoing formula, the distance score Sd is a value less than or equal to 1. When the distance obtained based on the position coordinate is less than or equal to 100, a non-zero score is obtained. When the distance obtained based on the position coordinate is greater than 100, a score of zero is obtained. The size of the foregoing specified value can be adjusted based on image resolution.

Figure 6:
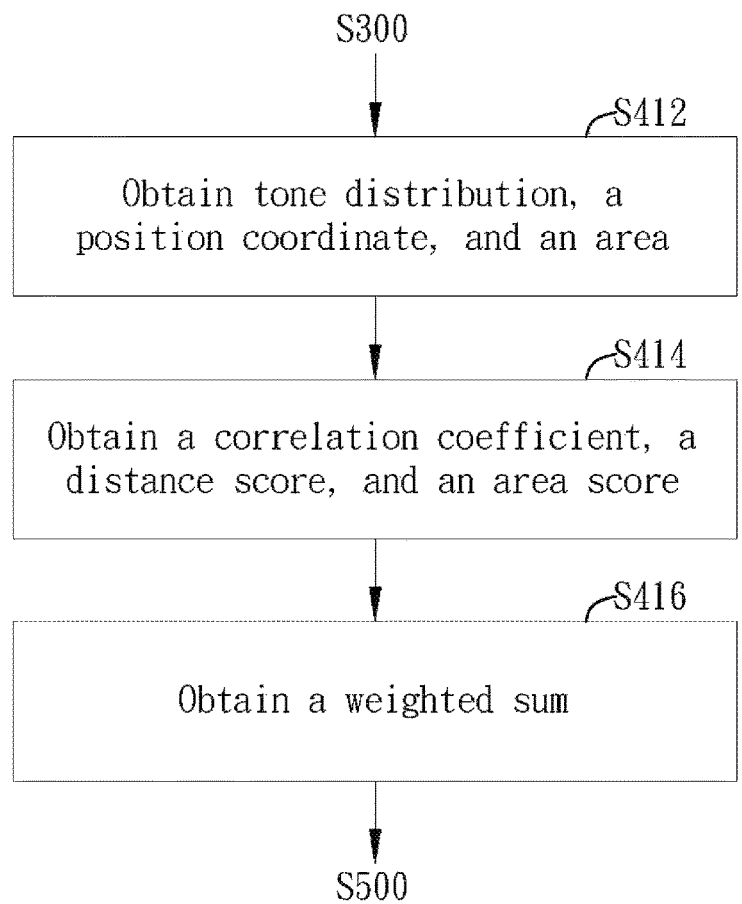
FIG. 6 is a flowchart of another embodiment of obtaining a first feature score.

FIG. 6 is a flowchart of another embodiment of obtaining a first feature score. As shown in FIG. 6, a flow of obtaining the first feature score includes step S412 to step S416. After the original images are obtained, the position box is generated, and the identified foreground image is determined, the flow proceeds to the step S412. In the step S412, tone distribution, a position coordinate, and an area are obtained from the identified foreground image. That is, different types of features, including the tone distribution, the position coordinate, and the area, are obtained from the identified foreground image. The position coordinate preferably corresponds to the whole of the target object. For example, a coordinate point of a geometric center of the identified foreground image is used as the position coordinate. In addition, the tone distribution and the area preferably correspond to the whole of the target object. The tone distribution is, for example, a statistical result of hue after the identified foreground image is converted into a hue, saturation, value (HSV) color space. The area is, for example, the area occupied by the identified foreground image. Generally, the features corresponding to the whole of the target object have an advantage of being easy to track, and a case in which the target object is missed during tracking can be improved. In addition, the image tracking manner of the present invention can be completed by using existing image capturing devices, and it does not need to be additionally disposed a photographing device in a different view angle, so that the system building costs can be reduced.

Figure 7:
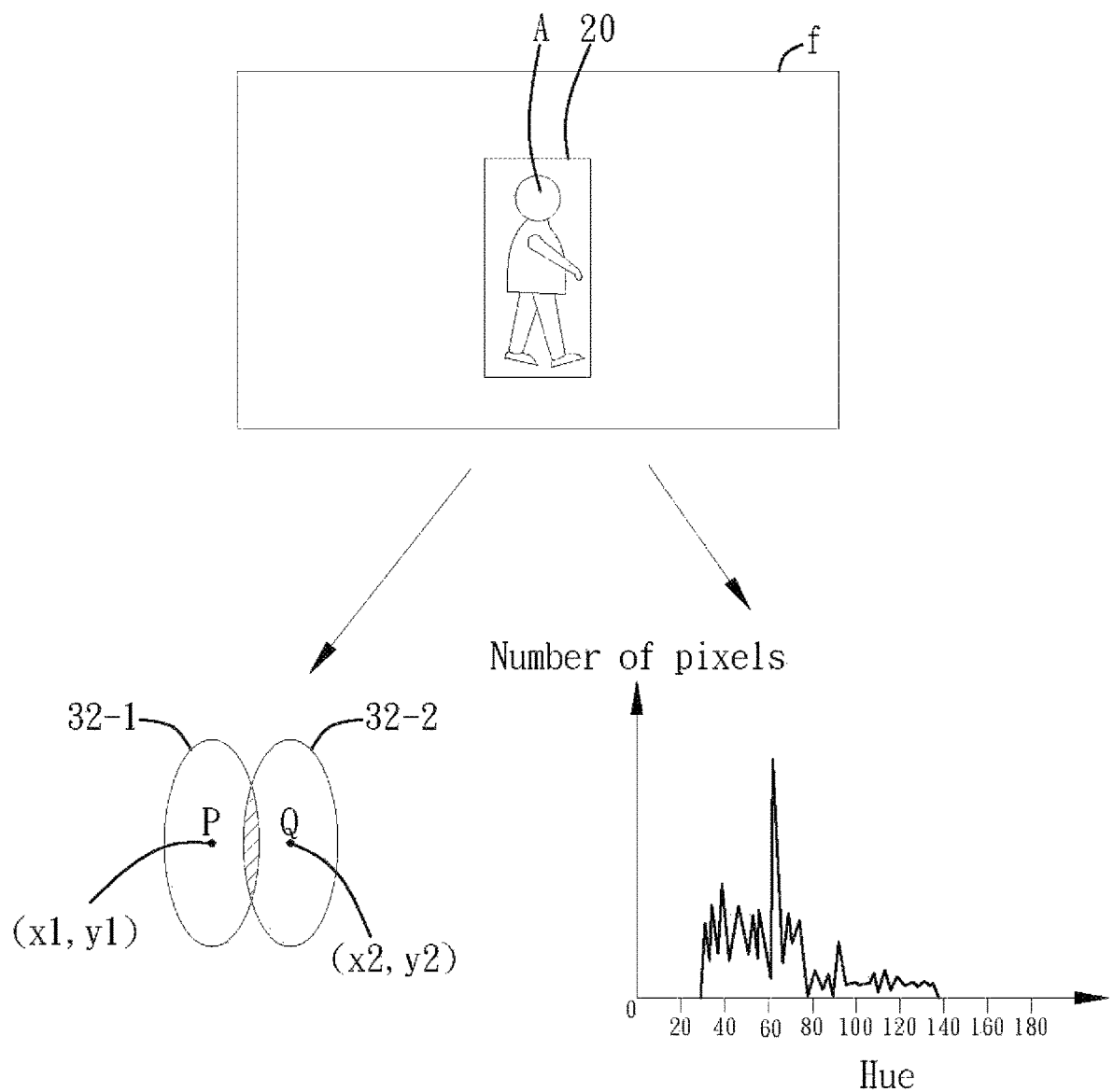
FIG. 7 is a schematic diagram of obtaining tone distribution, a position coordinate, and an area.

Referring to FIG. 7, FIG. 7 is a schematic diagram of obtaining tone distribution, a position coordinate, and an area. As shown in FIG. 7, a position box 20 corresponding to the target object (A) is generated in the frame (f). A position coordinate (x2, y2) of a position (Q) can be obtained from the identified foreground image 32-2 corresponding to the target object (A) in the frame (f). To facilitate description, content of the identified foreground image is omitted and is indicated only by using a profile in the figure. In addition, in another frame (not shown in the figure) obtained before the frame (f), a position coordinate (x1, y1) of a position (P) can be obtained from the identified foreground image 32-1 corresponding to the target object (A). In an embodiment, a moving distance of the target object (A) can be further obtained based on the position (P) and the position (Q). In other embodiments, a moving speed of the target object (A) can be further obtained based on the position (P) and the position (Q).

In addition, the area of the identified foreground image 32-1 can be obtained from a coverage area (approximately oval-shaped) of the identified foreground image 32-1. Similarly, the area of the identified foreground image 32-2 can be obtained. As shown in FIG. 7, the identified foreground image 32-1 overlaps with (indicated by a slash) the identified foreground image 32-2, and an area overlapping ratio (for example, a ratio of an overlapping part to the identified foreground image 32-2) can be further obtained based on an overlapping region.

In addition, the tone distribution can be obtained from the identified foreground image 32-2. In the relation graph shown in FIG. 7, the horizontal axis represents the hue, where the values represent different colors; and the longitudinal axis represents the number of pixels. In this way, number distribution of different colors in the identified foreground image 32-2 can be obtained through statistics collection. In addition, a statistical result will not be affected by a brightness change of a light shadow by adopting the HSV color space, thereby improving the correctness of a result obtained in a subsequent flow. Similarly, another tone distribution can also be obtained from the identified foreground image 32-1. A correlation coefficient can be further obtained based on the two identified foreground images.

Returning to FIG. 6, in step S414, different scoring items are obtained based on the features (the correlation coefficient, the distance score, and the area score) of the identified foreground image of the first frame and the features (the correlation coefficient, the distance score, and the area score) of the identified foreground image of the second frame.

TABLE 3

| Feature | Scoring item | Weight | First feature score |
|---|---|---|---|
| Tone distribution | Correlation coefficient Sn | Wn | WnSn + WdSd + WaSa |
| Position coordinate | Distance score Sd | Wd | |
| Area | Area score Sa | Wa | |

Referring to Table 3, as stated above, the correlation coefficient is obtained based on the tone distribution. For example, the correlation coefficient Sn is calculated through normalized cross correlation computation to obtain a similarity between the two adjacent identified foreground images. The correlation coefficient Sn is a value less than or equal to 1, and a larger value indicates a higher similarity.

In addition, the distance score Sd can be obtained based on the position coordinate. In the foregoing example, the distance can be calculated based on the position coordinate, and the distance score Sd can be obtained in a scoring function based on the specified value Td. Details are not described herein again.

For the area, the area can be obtained from the identified foreground images of the first frame and the second frame, and the area overlapping ratio can be obtained based on the overlapping region of the two identified foreground images. The area score Sa can be calculated based on the area overlapping ratio. For example, the area score Sa can be defined in the following scoring function:

$$Sa = \exp(-\mathrm{abs}(x-1))$$

where x represents the area overlapping ratio, abs( ) represents taking an absolute value, and exp( ) represents taking a natural exponential. For example, a manner of taking a value of x is: when two adjacent identified foreground images overlap, an overlapping ratio is used as the value of x. In this case, x is a value less than or equal to 1. When the two adjacent identified foreground images do not overlap, the value of x is 999. According to the foregoing formula, the area score Sa is a value less than or equal to 1. When two adjacent identified foreground images overlap, a larger overlapping area indicates that the area score is closer to 1; when the two adjacent identified foreground images do not overlap, the area score approaches to zero. In this way, the area score is obtained based on the area overlapping ratio and a result of performing exponentiation on the area overlapping ratio, wherein the area overlapping ratio is obtained based on the area.

In addition, as shown in Table 3, a first weight Wn corresponding to the correlation coefficient, a second weight Wd corresponding to the distance score, and a third weight Wa corresponding to the area score are stored in the computing device. In an embodiment, the first weight, the second weight, and the third weight can be respectively set to 0.5, 0.4, and 0.1. The set for the foregoing weights can be adjusted based on a photographing scene. As shown in FIG. 6, in the step S416, a weighted sum of the scoring items is obtained. As shown in Table 3, the first feature score is a weighted sum of values of the scoring items derived from the features and the weights corresponding to the values.

Figure 8:
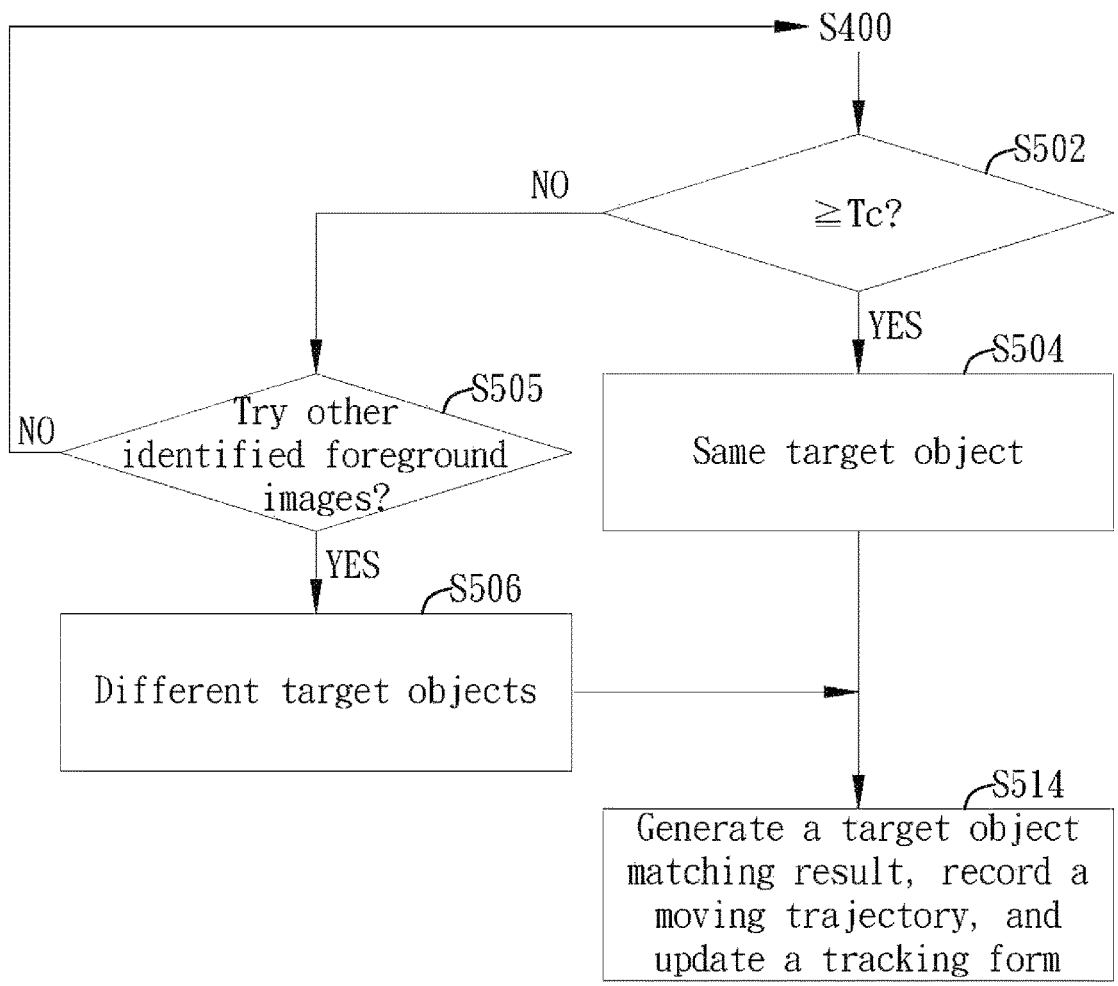
FIG. 8 is a flowchart of an embodiment of generating a target object matching result.

FIG. 8 is a flowchart of an embodiment of generating a target object matching result. As shown in FIG. 8, a flow of generating the target object matching result includes step S502 to step S514. After the original images are obtained, the position box is generated, the identified foreground image is determined, and the first feature score is obtained, the flow proceeds to the step S502. In the step S502, the first feature score is obtained and it is determined whether the first feature score is greater than or equal to a second threshold $T_c$. When the first feature score is greater than or equal to the second threshold $T_c$, it is determined that the identified foreground image of the first frame and the identified foreground image of the second frame correspond to the same target object (step S504); and otherwise, when the first feature score is less than the second threshold $T_c$, it is determined that the identified foreground image of the first frame and the identified foreground image of the second frame correspond to different target objects.

Figure 9:
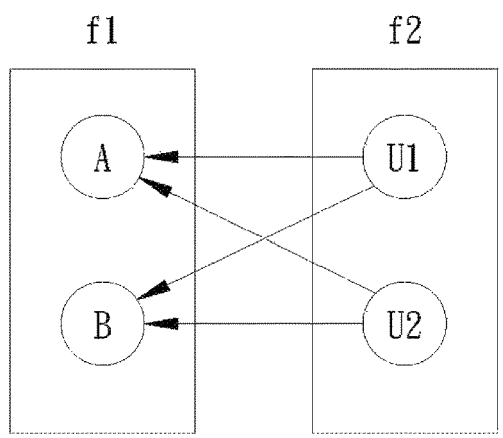
FIG. 9 is a schematic diagram of pairing target objects.

Further, there may be more than one identified foreground image needing to be compared in adjacent frames. Therefore, the process of obtaining the first feature score includes a plurality of paired combinations. Referring to FIG. 8 and FIG. 9, FIG. 9 is a schematic diagram of pairing target objects. By using FIG. 9 as an example, the target object (A) and the target object (B) are identified in the frame f1, and the identified foreground images of the target object (A) and the target object (B) are stored in the tracking form. The target object U1 and the target object U2 are identified in the frame f2. At this time, the identification result is not yet stored in the tracking form. In FIG. 9, the first feature scores corresponds to combinations: U1 and (A), U1 and (B), U2 and (A), and U2 and (B). For example, if it is determined based on the foregoing flow that the target object U1 is the target object (A), when the first feature score of U2 and (A) is obtained, it is found that the identified foreground images of U2 and (A) correspond to different target objects. Referring to FIG. 8, it is determined that other identified foreground images are tried (step S505). If the obtained first feature score of U2 and (B) is also less than the second threshold $T_c$, it is determined that the identified foreground images of U2 and (B) correspond to different target objects, and it is further learned that the identified foreground image of the target object U2 and the identified foreground image in the tracking form correspond to different target objects (step S506). In other words, when all the obtained first feature scores are less than the second threshold $T_c$, it can be learned that the target object U2 is a new target object. Finally, as shown in FIG. 8, in the step S514, the target object matching result is generated, the moving trajectory is recorded, and the tracking form is updated. In the foregoing example, the tracking form is updated by using the identified foreground image of the frame f2.

Figure 10:
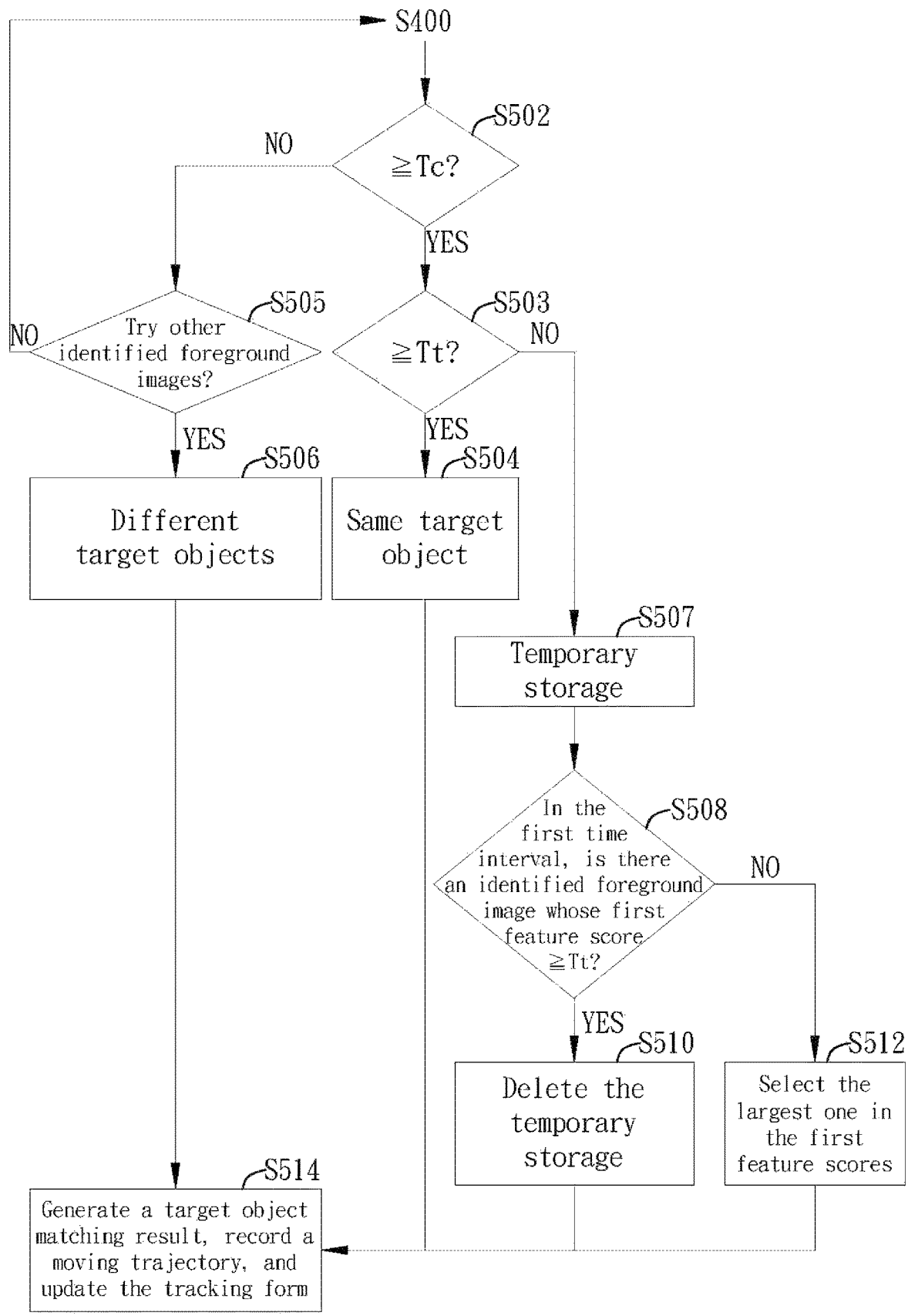
FIG. 10 is a flowchart of another embodiment of generating a target object matching result.

FIG. 10 is a flowchart of another embodiment of generating a target object matching result. As shown in FIG. 10, a flow of generating the target object matching result includes the step S502 to the step S514. The step S502 to the step S506 are stated above, and the difference between the method shown in FIG. 10 and the method shown in FIG. 8 is that determining of a third threshold $T_t$ (step S503) is added in FIG. 10. After it is determined that the first feature score is greater than or equal to the second threshold, the first feature score is compared with the third threshold. When the first feature score is greater than or equal to the second threshold $T_c$, and is greater than or equal to the third threshold $T_t$, it is determined that the identified foreground image of the first frame and the identified foreground image of the second frame correspond to the same target object (the step S504). The third threshold is greater than the second threshold. For example, the second threshold is set to 0.75, and the third threshold is set to 0.95.

When the first feature score is less than the third threshold $T_t$, the flow proceeds to step S507. As shown in FIG. 8, in the step S507, the identified foreground image is temporarily stored. For example, the identified foreground image is stored in a temporary storage form. In step S508, it is determined whether the first feature score of the identified foreground image in a first time interval is greater than or equal to the third threshold $T_t$. If yes, temporary storage is deleted (step S510), and the tracking form is updated by using the identified foreground image whose first feature score is greater than or equal to the third threshold $T_t$ (the step S514); and if no, the identified foreground image corresponding to the largest first feature score in the first feature scores is selected (step S512), and the tracking form is updated (the step S514). In this way, the target object matching result is generated based on the first feature score, the second threshold, the third threshold, and the time interval. The reliability of the identified foreground image stored in the tracking form is further ensured by using the added third threshold.

By using the following Table 4 as an example, the original images include a frame 1, a frame 2, a frame 3, and a frame 4. A target object (A) and a target object (B) are identified in the frame 1, and identified foreground images of the target object (A) and the target object (B) are stored in the tracking form. A target object U1, a target object U2, and a target object U3 are identified in the frame 2. It is determined that the target object U1 is the target object (A), the target object U3 is different from the target object (C), and identified foreground images of the target object U1 and the target object U3 are stored in the tracking form. In addition, upon comparison, the target object U2 is similar to the target object (B). However, because the first feature score of U2 and the target object B of the frame 1 is less than the third threshold $T_t$, the identified foreground image of the target object U2 is placed in the temporary storage form. Identification results of other frames are observed within first time interval, where the first time interval, for example, is set to time of three frames.

TABLE 4

|  | Frame 1 | Frame 2 | Frame 3 | Frame 4 |
|---|---|---|---|---|
| Tracking form | A | U1 = A | A | A |
|  | B | U3 = C | C | C |
| Temporary storage form |  | U2 = B (0.85) | B (0.88) | B (0.93) |

As shown in Table 4, three target objects are identified in both the frame 3 and the frame 4, and the target object (A) and the target object (C) are successfully tracked. Another target object of the frame 3 is similar to the target object (B) of the frame 1. However, because the first feature score is less than the third threshold $T_t$ (0.95), the identified foreground image of the another target object of the frame 3 is placed in the temporary storage form. Similarly, the another target object of the frame 4 is similar to the target object (B) of the frame 1. However, because the first feature score of the another target object and the target object B of the frame 1 is less than the third threshold $T_t$, the identified foreground image of the another target object of the frame 4 is placed in the temporary storage form. As the example stated above, when the first time interval is set to time of three frames (the frame 2 to the frame 4), none of first feature scores (obtained based on the identified foreground image of the frames within the first time interval and the identified foreground image in the tracking form) are greater than or equal to the third threshold $T_t$, and the first feature score (referring to the number marked in the brackets) obtained based on the target object of the frame 4 and the target object (B) of the frame 1 is greater than the first feature scores in other frames. Therefore, the identified foreground image of the target object of the frame 4 is selected and stored in the tracking form. In other embodiments, the first time interval can be adjusted based on requirements.

Figure 11:
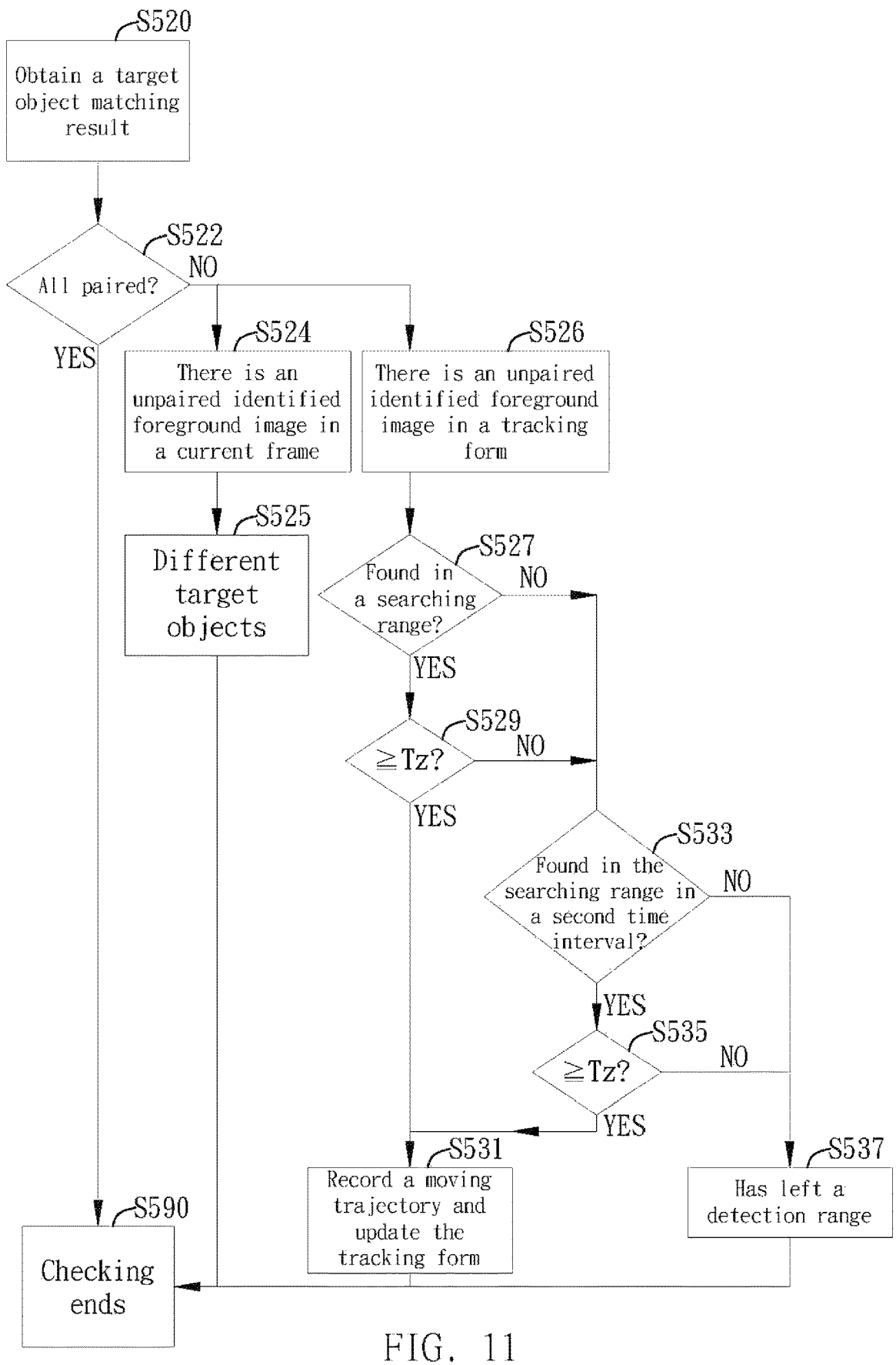
FIG. 11 is a flowchart of an embodiment of checking the target object matching result.

FIG. 11 is a flowchart of an embodiment of checking the target object matching result. As shown in FIG. 11, a flow of checking the target object matching result includes step S520 to step S590. In the step S520, the target object matching result is obtained. In step S522, it is determined whether identified foreground images are all paired in the target object matching result. If the identified foreground images are all paired, the checking ends (the step S590), and if there is an unpaired identified foreground image, the flow proceeds to step S524 or step S526. In the step S524, when a current frame has an unpaired identified foreground image, it is determined that the target object corresponding to the unpaired identified foreground image in the current frame is a different target object (step S525).

Figure 12A:
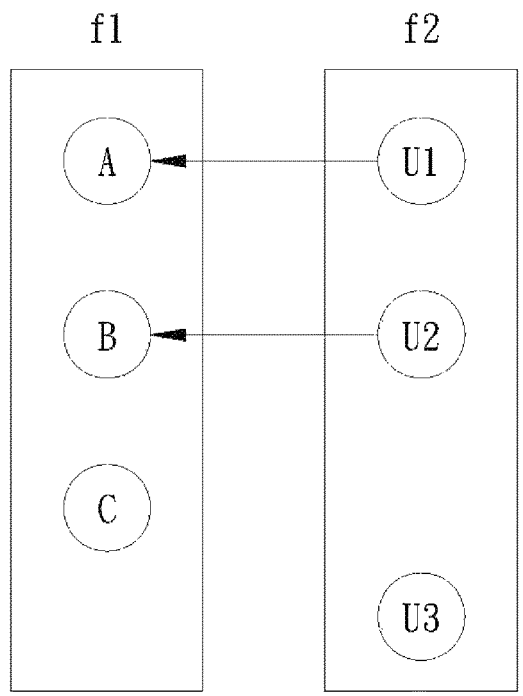
FIG. 12A is a schematic diagram of another embodiment of pairing target objects.

Referring to FIG. 11 and FIG. 12A, FIG. 12A is a schematic diagram of another embodiment of pairing target objects. By using FIG. 12A as an example, a target object matching result is generated from the frame f1 and the frame f2, where the frame f2 is a current frame. Based on the target object matching result, the target object U1 identified in the frame f2 is the target object (A), and the target object U2 identified in the frame f2 is the target object (B). The target object U3 identified in the frame f2 and the previous identified foreground image do not correspond to the same target object, and therefore it is determined that the target object U3 is a different target object.

Figure 12B:
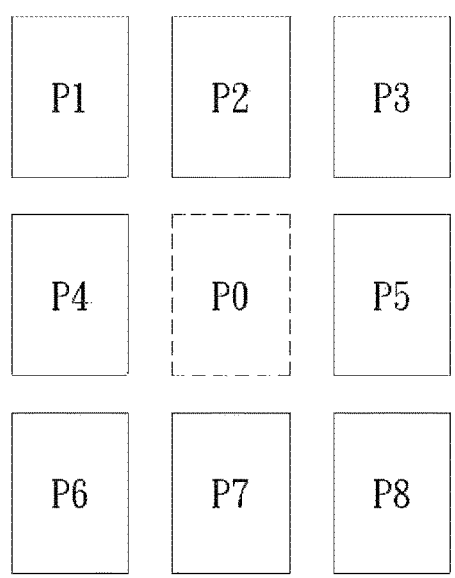
FIG. 12B is a schematic diagram of searching for image data.

As shown in FIG. 11, in the step S526, when there is an unpaired identified foreground image in the tracking form, the flow proceeds to step S527 to step S537. The identified foreground image of the tracking form is defined relative to the current frame. By using FIG. 12A as an example, the current frame is the frame f2, and the identified foreground image of the tracking form is the identified foreground image of the frame f1. As shown in FIG. 12A, the target object matching result shows that the identified foreground image of the target object (C) corresponding to the frame f1 is not updated, and searching is performed based on a specified searching range. Referring to FIG. 12B, FIG. 12B is a schematic diagram of searching for image data. For example, the target object (C) may not be paired due to blocking, and based on the position coordinate of the identified foreground image of the target object (C) corresponding to the frame f1, the target object (C) is located at a position P0. In addition, searching is performed at possible positions in the frame f2 based on the preset searching range (for example, a distance of five pixels). As shown in FIG. 12B, the possible positions form a set, including a position P1 to a position P8. Searching is performed in the frame f2 for whether there is a piece of image data corresponding to the same target object to which the identified foreground image of the target object (C) corresponding to the frame f1 corresponds.

As shown in FIG. 11, in the step S527, it is determined whether the image data is found in the searching range, and in step S529, it is determined whether the second feature score is greater than or equal to a fourth threshold $T_z$. The second feature score, for example, is scored by using the foregoing correlation coefficient, and the value of the correlation coefficient is compared with the value of the fourth threshold $T_z$. By using FIG. 12A and FIG. 12B as an example, if the image data is found at one of the positions P1 to P8 of the frame f2, and the correlation coefficient (the second feature score) obtained based on the tone distribution of the identified foreground image of the frame f1 and the tone distribution of the image data of the frame f2 is greater than or equal to the fourth threshold, it is determined that the found image data is the target object (C). Next, the moving trajectory is recorded and the tracking form is updated (step S531), and the checking ends (step S590).

When no consistent image data is found in the searching range or the second feature score of the image data is less than the fourth threshold $T_z$, it is determined whether there is any image data whose second feature score is greater than or equal to the fourth threshold $T_z$ in the second time interval, (step S533 and step S535). If yes, the moving trajectory is recorded and the tracking form is updated (step S531), and the checking ends (the step S590), and if the wanted image data is still not found, or the second feature score of image data is less than the fourth threshold $T_z$, it is determined that the target object corresponding to the identified foreground image has left the detection range (the step S537), and the checking ends (the step S590). In this way, it is avoided that a target object that is not tracked in the process is considered as a new target object when the target object appears in a subsequent frame.

By using the following Table 5 as an example, the original images include the frame 1 to the frame 4. A target object (A), a target object (B), and a target object (C) are identified in the frame 1, and the identified foreground images of the target objects are stored in the tracking form. Three target objects are identified in both the frame 2 and the frame 3, and the target object (A) and the target object (B) are successfully tracked. Another target object is a different target object (D). In the frame 2, the foregoing checking flow is implemented. There is no image data whose second feature score is greater than or equal to the fourth threshold $T_z$. Checking is performed within the preset second time interval (for example, time of three frames, namely, the frame 2 to the frame 4). As shown in Table 5, the wanted image data is still not found by implementing the foregoing searching flow in the frame 3. Next, the target object (A), the target object (B), and the target object (D) are successfully tracked in the frame 4, and the target object (C) is also tracked in the identified foreground images within the second time interval (three frames and that are stored in the tracking form), then the checking ends, and the searching flow of the step S527 to the step S537 does not need to be implemented in the frame 4.

TABLE 5

|  | Frame 1 | Frame 2 | Frame 3 | Frame 4 |
|---|---|---|---|---|
| Tracking form | A | A | A | A |
|  | B | B | B | B |
|  | C | D | D | C |
|  |  |  |  | D |

In another example, if, in the Table 5, the identification result of the frame 4 is the same as the result shown in the frame 2 and the frame 3 (i.e. three target objects (A, B, and D) are identified), image data consistent with the target object (C) is not found by implementing the foregoing search flow, for this case, because no consistent image data is found in the second time interval, it is determined that the target object (C) has left the detection range of the image capturing device. In other embodiments, searching can be performed by setting a searching range about position coordinates and further by setting moving speed. Searching is performed based on the previous position coordinate of the target object and the moving speed of the target object, thereby improving the accuracy of searching.

Figure 13:
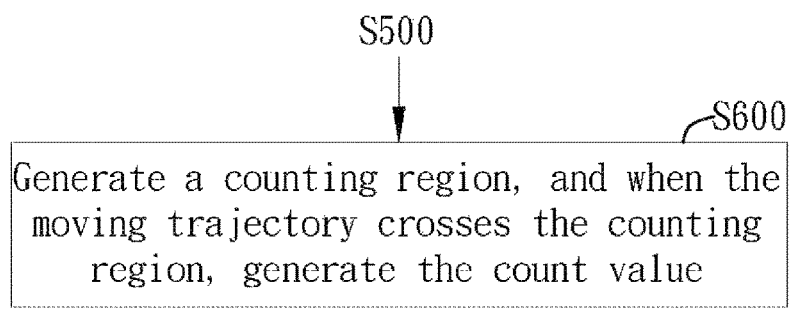
FIG. 13 is a flowchart of an embodiment of generating a count value.
Figure 14:
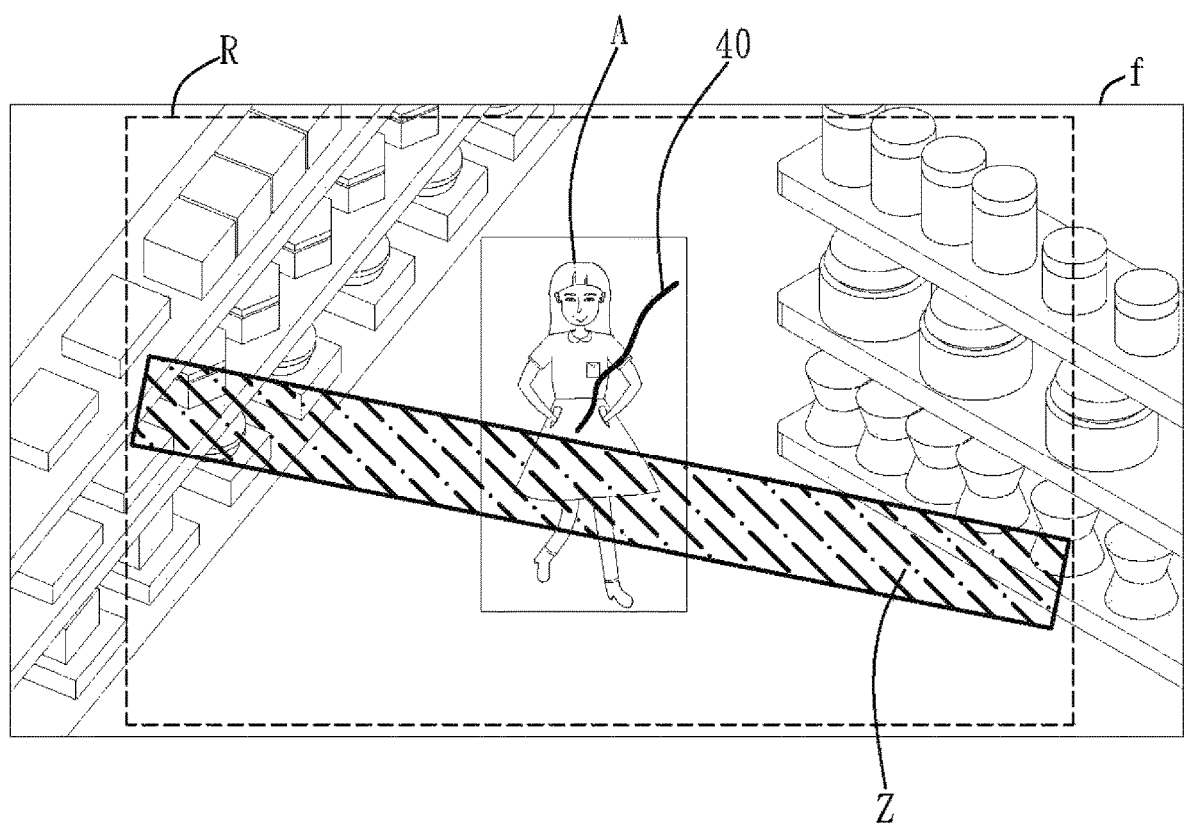
FIG. 14 is a schematic diagram of an embodiment of executing counting.

FIG. 13 is a flowchart of an embodiment of generating a count value. As shown in FIG. 13, after the target object matching result is generated, a counting stage is further included. In step S600, a counting region is generated in each original image, and when the moving trajectory of the target object crosses the counting region, a count value is generated. Referring to FIG. 14, FIG. 14 is a schematic diagram of an embodiment of executing counting. As shown in FIG. 14, there is a detection range (R) in the frame (f), and a counting region (Z) is generated in the frame (f). A target object (A) is identified in the frame. When the moving trajectory (40) of the target object (A) crosses the counting region (Z), it is determined that the target object passes the detection range (R), and the number of the target object is accumulated.

Figure 15:
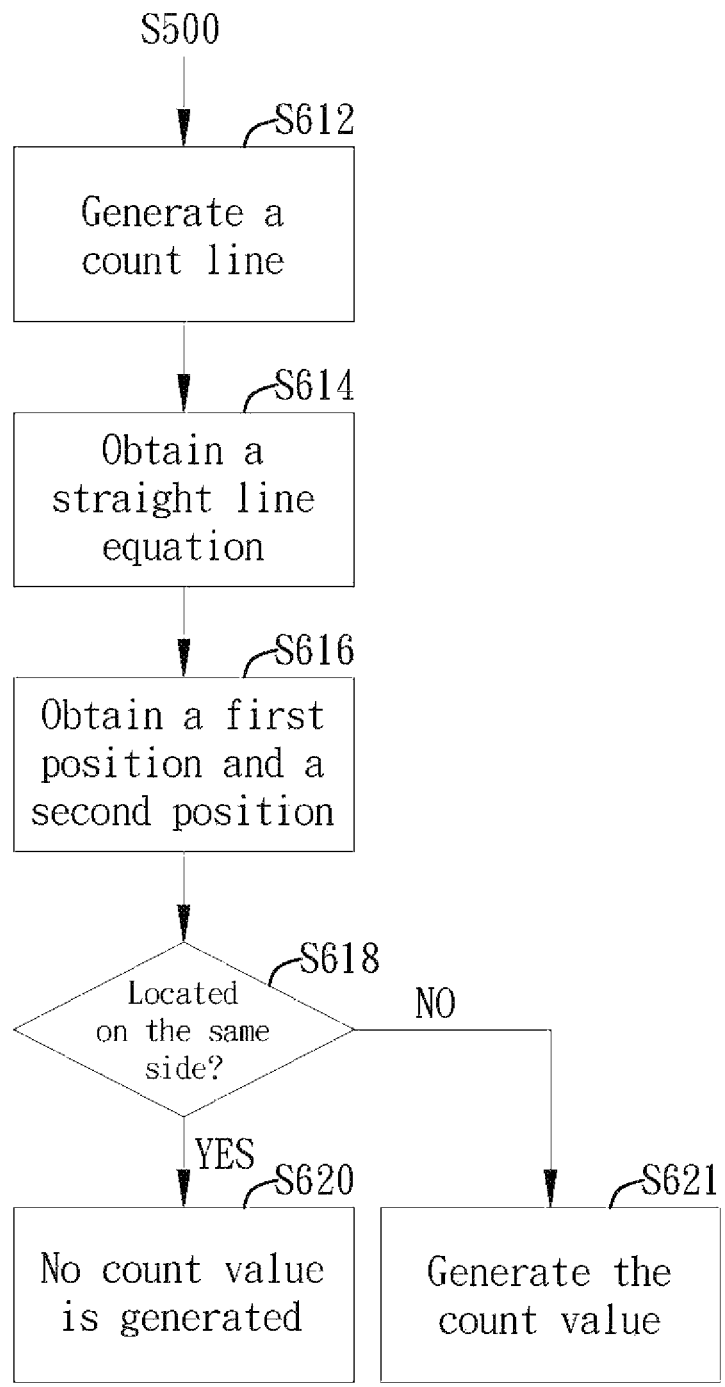
FIG. 15 is a flowchart of another embodiment of generating the count value.

FIG. 15 is a flowchart of another embodiment of generating the count value. As shown in FIG. 15, after the target object matching result is generated, a counting flow includes step S612 to step S621. In the step S612, a count line is generated. For example, a count line corresponding to the counting region is generated. The count line can be located at a position between two edges of the counting region, or overlaps with one of the edges of the counting region. In step S614, a straight line equation of the count line is obtained. In step S616, a first position and a second position of the moving trajectory are obtained. For example, the target object is located at the first position in a previous frame, and is located at the second position in a current frame. In step S618, it is determined whether the first position and the second position are located on the same side of the count line. If yes, the count value is not generated (step S620), and if not, the count value is generated (the step S621).

Figure 16A:
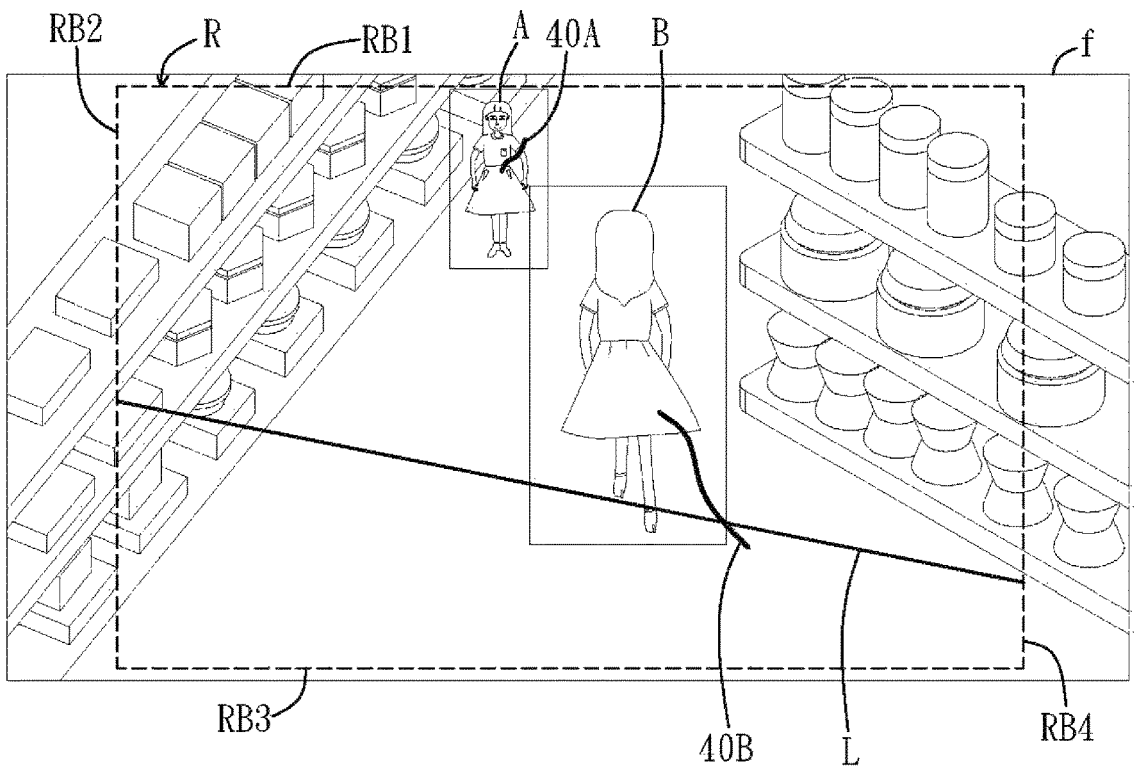
FIG. 16A is a schematic diagram of another embodiment of executing counting.
Figure 16B:
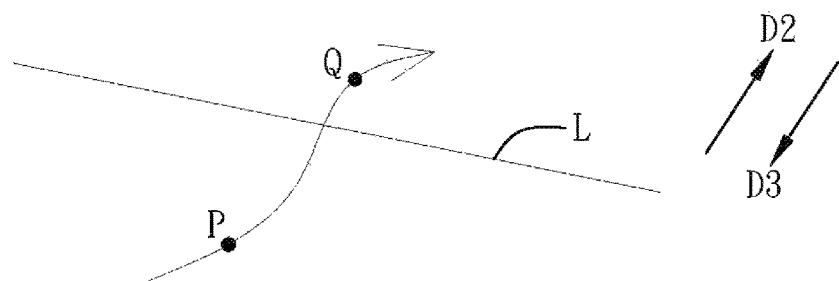
FIG. 16B is a schematic diagram of performing counting by using a count line.

Referring to FIG. 16A and FIG. 16B, FIG. 16A is a schematic diagram of another embodiment of executing counting; and FIG. 16B is a schematic diagram of performing counting by using a count line. As shown in FIG. 16A, there is a detection range (R) in the frame (f), and a counting line (L) is generated in the frame (f). A target object (A) and a target object (B) are identified in the frame (f). It is determined that the target object (A) has crossed the count line (L) based on the moving trajectory of the target object (A), and therefore, in this event, the number of the target object is accumulated. In addition, it is determined that the target object (B) does not cross the count line (L) based on the moving trajectory of the target object (B), and therefore, in this event, the number of the target object is not accumulated.

It should be noted that the position of the count line (L) can be set based on a flowing direction of the target object. For example, the count line (L) preferably passes an intermediate position of an image, and does not overlap with a boundary of the detection range (R). As shown in FIG. 16A, the detection range (R) has detection boundaries RB1 to RB4. The count line does not overlap with the detection boundaries RB1 to RB4 (that is, they are located on different straight lines).

As shown in FIG. 16B, the moving trajectory of the target object passes the count line (L). The count line (L), for example, has a straight line equation: $ax+by+c=0$. The moving trajectory of the target object has a position (P) and a position (Q). For example, based on the straight line equation, the position (P) is located on one side of the straight line equation: $ax+by+c<0$, and the position (Q) is located on the other side of the straight line equation $ax+by+c>0$. Because the position of the target object moves to a different side of the count line, the count value is generated.

It should be noted that because features corresponding to the whole of the target object are obtained, tracking of a target object is not limited to a specific direction. In other words, as shown in the example of FIG. 16A, tracking and counting can be performed on both the target object (A) and the target object (B) that move toward different directions. Regarding FIG. 16B, tracking and counting can be performed on both the moving trajectory that passes the count line (L) toward a direction D2 and the moving trajectory that passes the count line (L) toward a direction D3 opposite to the direction D2. In this way, the correctness of counting is improved and omission is avoided.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An image tracking method, used for detecting at least one target object, the image tracking method comprising the following steps:
   (A) continuously obtaining a plurality of original images corresponding to a detection range by using an image capturing device, wherein the plurality of original images comprise a first frame and a second frame;
   (B) transmitting the plurality of original images to a computing device for identifying the plurality of original images to generate a position box corresponding to the target object based on a preset image set;
   (C) obtaining an initial foreground image comprising the target object from the position box by using the computing device, wherein there is a pixel ratio between the initial foreground image and the position box, and an identified foreground image is determined based on the pixel ratio and a first threshold;
   (D) obtaining at least one feature from the identified foreground image, and obtaining a first feature score based on the feature of the identified foreground image of the first frame and the feature of the identified foreground image of the second frame; and
   (E) generating a target object matching result based on the first feature score and a second threshold, and recording a moving trajectory of the target object based on the target object matching result;
   wherein in the step (D), a plurality of features are obtained from the identified foreground image, and the plurality of features comprise tone distribution, a position coordinate, and an area that correspond to a whole of the target object, and the step (D) comprises: obtaining a correlation coefficient based on the tone distribution; obtaining a distance score based on a specified value and a distance that is obtained based on the position coordinate; obtaining an area score based on an area overlapping ratio and a result of performing exponentiation on the area overlapping ratio, wherein the area overlapping ratio is obtained based on the area; and setting a first weight corresponding to the correlation coefficient, a second weight corresponding to the distance score, and a third weight corresponding to the area score, wherein the first feature score is a weighted sum of values derived from the plurality of features and the weights corresponding to the values.

2. The method of claim 1, wherein the image capturing device performs shooting in a depression angle, and an angle between a shooting direction of the image capturing device and a horizontal line is greater than 0 degrees and less than 90 degrees.

3. The method of claim 1, wherein the step (C) comprises: filtering a background image in the position box to obtain the initial foreground image.

4. The method of claim 1, wherein in the step (C), when the pixel ratio is greater than or equal to the first threshold, the initial foreground image is set to the identified foreground image, and when the pixel ratio is less than the first threshold, the position box corresponding to the initial foreground image is deleted.

5. The method of claim 1, wherein in the step (D), the feature comprises a position coordinate corresponding to a whole of the target object, and the step (D) comprises: obtaining a distance score as the first feature score based on a specified value and a distance that is obtained based on the position coordinate.

6. The method of claim 1, wherein in the step (E), when the first feature score is greater than or equal to the second threshold, it is determined that the identified foreground image of the first frame and the identified foreground image of the second frame correspond to the same target object, and when the first feature score is less than the second threshold, it is determined that the identified foreground image of the first frame and the identified foreground image of the second frame correspond to different target objects.

7. The method of claim 1, wherein the identified foreground image of the first frame is stored in a tracking form, the plurality of original images comprise a third frame, and the step (E) comprises:
   setting a third threshold and a first time interval, wherein the third threshold is greater than the second threshold;
   after it is determined that the first feature score is greater than or equal to the second threshold, comparing the first feature score with the third threshold;
   when the first feature score is greater than or equal to the third threshold, determining that the identified foreground image of the first frame and the identified foreground image of the second frame correspond to the same target object;
   when the first feature score is less than the third threshold, obtaining another first feature score based on the feature of the identified foreground image of the first frame and the feature of the identified foreground image of the third frame, wherein the third frame is obtained in the first time interval; and selecting the identified foreground image corresponding to the largest first feature score in these first feature scores to update the tracking form.

8. The method of claim 1, wherein the identified foreground image of the first frame is stored in a tracking form, and the step (E) comprises:

setting a searching range, a second time interval, and a fourth threshold;

when the target object matching result shows that the identified foreground image of the first frame is not updated, searching for whether there is a piece of image data corresponding to the same target object to which the identified foreground image of the first frame corresponds is performed in the second frame based on a position coordinate of the identified foreground image of the first frame and the searching range;

obtaining a second feature score based on the feature of the identified foreground image of the first frame and the feature of the image data of the second frame, and when the second feature score is greater than or equal to the fourth threshold, determining the identified foreground image of the first frame and the image data of the second frame correspond to the same target object; and when the image data is not found in the second time interval, determining that the target object corresponding to the identified foreground image of the first frame has left the detection range.

9. The method of claim 1, further comprising step (F): generating a counting region in each original image, and when the moving trajectory of the target object crosses the counting region, a count value is generated.

10. The method of claim 9, wherein the step (F) comprises: generating a count line corresponding to the counting region, wherein the count line has a straight line equation, and the moving trajectory of the target object has a first position and a second position; and generating the count value based on the straight line equation when the first position and the second position are located at different sides of the count line.

11. The method of claim 10, wherein the count value is generated based on a moving trajectory that crosses the count line toward a first direction and a moving trajectory that crosses the count line toward a second direction opposite to the first direction.

* * * * *